Sept. 3, 1940.　　　　　　　E. A. SLYE　　　　　　　2,213,597
COMPUTING COUNTER
Filed March 22, 1937　　　　　　5 Sheets-Sheet 1

INVENTOR
Edward A. Slye
By
ATTORNEY

Sept. 3, 1940.  E. A. SLYE  2,213,597
COMPUTING COUNTER
Filed March 22, 1937   5 Sheets-Sheet 4

Sept. 3, 1940.                    E. A. SLYE                     2,213,597
                              COMPUTING COUNTER
                           Filed March 22, 1937              5 Sheets-Sheet 5

INVENTOR
Edward A. Slye
By
ATTORNEY

Patented Sept. 3, 1940

2,213,597

UNITED STATES PATENT OFFICE 2,213,597

COMPUTING COUNTER

Edward A. Slye, East Hartford, Conn., assignor to Veeder-Root Incorporated, a corporation of Connecticut Application March 22, 1937, Serial No. 132,375

14 Claims. (Cl. 235—144)

My invention relates to computing counters.

It has among its objects to provide an improved computing counter of the character described and claimed in my copending application Serial No. 716,696, filed March 21, 1934. A further object of my invention is to provide such a counter having improved resetting mechanism, and, more particularly, such an improved mechanism which is operative only in such manner as to insure an accurate count. A still further object of my invention is to provide such an improved resetting mechanism which is so operative, irrespective of wide variations in the method of operation of the operating member thereof, whether these variations result from carelessness or abuse by the operator, or as a result of manipulations of the resetting mechanism by the operator in an effort to defraud. Still another object of my invention is to provide such an improved resetting mechanism, which, while obtaining the advantages above set forth, is more easily operated, and yet wherein the various cooperating mechanisms are definitely and positively controlled so that their operation in the desired predetermined manner and sequence is assured, following the initiation of the resetting operation by the rotation of the reset operating member. These and other objects of my improved construction will, however, hereinafter more fully appear.

In the accompanying drawings, I have shown for purposes of illustration one embodiment which my invention may assume in practice, the same being shown, to facilitate illustration, without the variator or meter driving connections which, it will be understood, drive the cost and quantity counters, respectively, of such a computing counter.

In this illustrative construction, the counter is of the general type described and claimed in my above mentioned application, including a plurality of cost counters 1 comprising coaxial counter wheels operatively connected by usual transfer mechanism, and a plurality of like quantity, or gallon, counters 2; these several counters being disposed in a suitable frame 3, with the cost counters 1 driven from a driving shaft 4 adapted to be operatively connected to a variator, not shown, and the quantity counters 2 driven from a shaft 5 (Fig. 10) adapted to be driven by a meter, not shown.

Figure 2:
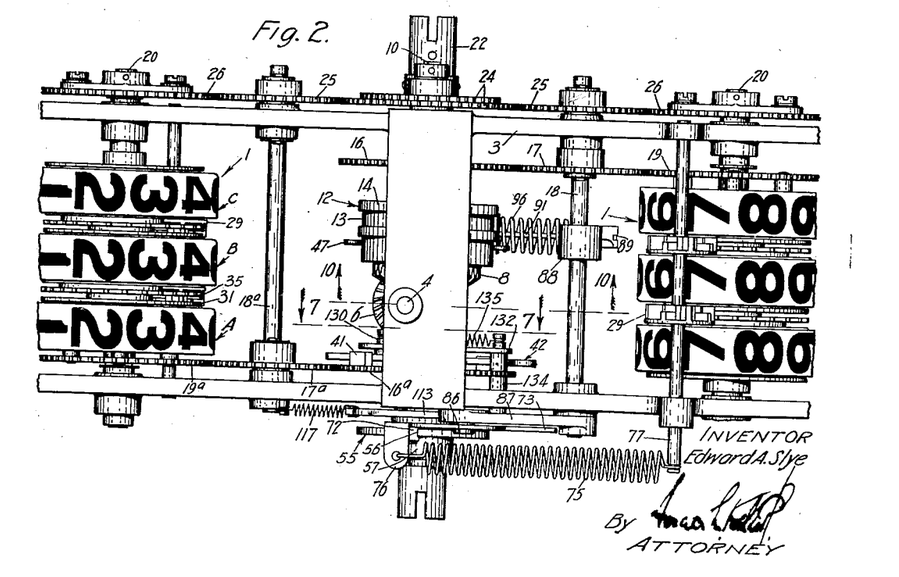
Fig. 2 is a top plan view of this counter mechanism.
Figure 15:
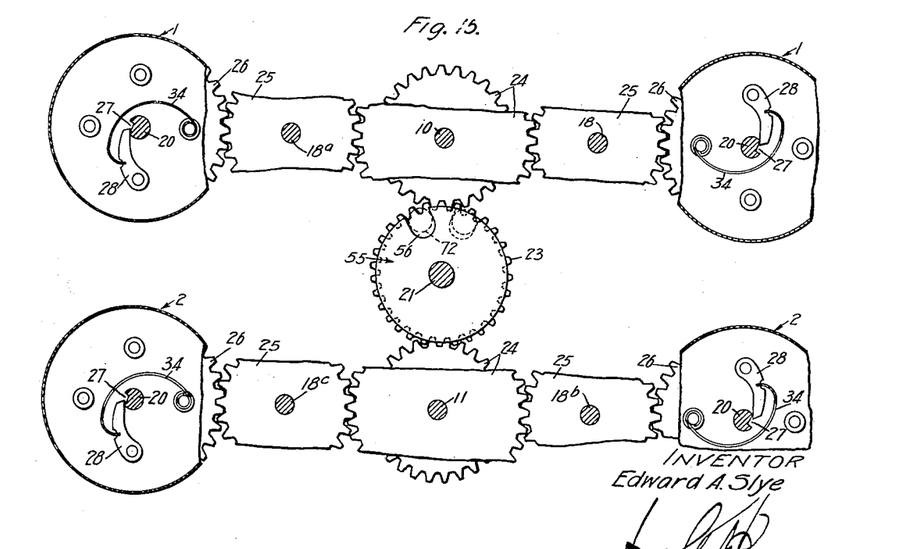
Fig. 15 is a somewhat diagrammatic view of the resetting mechanism.

Here, it will be noted that the driving connections for these counters are essentially similar to those in my previously mentioned application, including bevel gears 6, 7 on the shafts 4 and 5, respectively, driving cooperating bevel gears 8 and 9 freely rotatable on cost and quantity counter driving shafts 10 and 11. Further, it will be noted that each of these cooperating bevel gears 8, 9 is connected to its shaft by a ball clutch 12 comprising driving and driven elements 13, 14 and balls 15; the driving elements 13 being in the form of external drums fixed to the cooperating bevel gear, while the elements 14 are fixed to the shafts 10 and 11. Here, it will also be noted that the right hand cost counter 1 is driven from its driving shaft 10 (Fig. 2) through a spur gear train including a spur gear 16 fixed to the shaft 10, a meshing intermediate spur gear 17 rotatable on an intermediate shaft 18, and a third spur gear 19 disposed coaxially with the number wheels of cost counter 1; this gear 19 herein being fixed to the lowest order number wheel and rotatable on the axis of the axially disposed counter resetting shaft 20. Here note that the left hand cost counter 1 is driven by a like train 16a, 17a, 19a and that the two trains are connected so that the lowest order wheels of the two cost counters are diagonally opposite and driven in the same direction. Note here also that the right and left hand quantity counters 2 are similarly diagonally driven from the lower shaft 11 through right and left hand trains 16b, 17b, 19b and 16c, 17c, and 19c, respectively. Further, all of the counters 1, 2 are reset upon rotation of a reset operating shaft 21 disposed between the shafts 10 and 11 and having on each end an operating socket 22 adapted to receive a suitable operating key (not shown) for rotating the shaft to effect resetting. Note also that spur gear resetting trains are provided, driven from a common gear 23 rotatable with the shaft 21 and carried on the rear end thereof, and operative to drive trains for resetting both sets of counters comprising, as shown in Figure 15, a double spur gear 24, meshing intermediate gears 25, and gears 26 fixed to the reset shafts 20 and operative to rotate the latter in a counting direction to return all of the counter wheels 1, 2 to zero in a single resetting operation of the shafts 20. Here, note also that, as shown, these shafts 20 are provided with usual grooves or notches 27 therein, adapted to cooperate with usual pawls 28 carried by each number wheel and operative to reset the number wheels in a usual manner.

The several cost and quantity counters 1, 2 are each of the general construction and operation described in my above mentioned application, and accordingly need not be specifically described herein. It should, however, be noted that the lowest order number wheel A of each counter is fixed to and rotatable with its spur gear 19, 19a, 19b or 19c, heretofore described, while this wheel A is operatively connected to the next higher order wheel B, and the wheel B is connected to the next higher order wheel C, by usual transfer mechanisms including transfer pinions 29. Each of these mechanisms herein also includes cooperating abutment means similar to those in my prior application for preventing overtravel of the several counter wheels, this abutment means including a two-toothed abutment member 30 carried on a locking disc 31 on each lower order wheel and having a cam surface 32 adapted to be engaged by a pawl 33 rotatable with the next adjacent higher order wheel. Here also it will be understood that each number wheel A, B, C is provided with a pawl 28, heretofore mentioned, which is adapted to cooperate as heretofore described with the resetting slot 27 in its reset shaft 20. As in my prior case, a spring 34 also acts on each pawl 28 and each transfer mechanism includes a 20-toothed gear 35 meshing with the transfer pinion 29 and each counter wheel B and C also carries a 10-toothed ratchet 36 and cooperating pawls 37, 38 and springs 39, 40, cooperating to constitute the clutch mechanism between the 20-toothed gears and the number wheels B, C.

Figure 1:
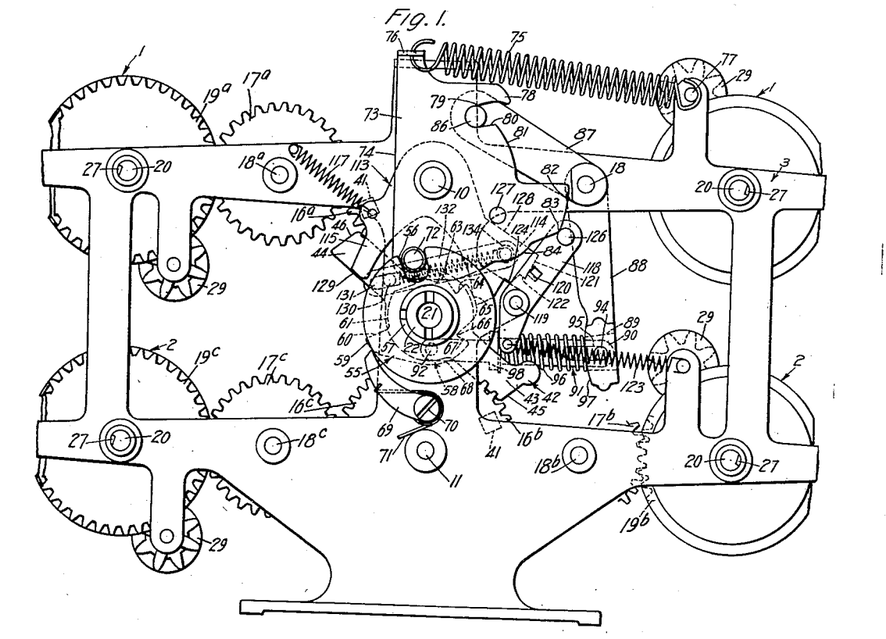
Figure 1 is a side elevation of the counter mechanism, viewed from the side on which the controlling mechanism is carried, with the latter mechanism shown in the normal position of the parts during counting.

Further, it will be noted that, as in my previous application, each gear 16a, 16c of the driving trains which drive the left hand cost and left hand quantity counters also carries on the inside face of the same, a block or stop lug 41 adapted to cooperate with an oscillatable stop arm 42, which is herein loosely journaled on the reset shaft 21, in such manner that oppositely extending portions 43, 44, on this member 42 present abutment faces 45, 46 in the path of the different stops 41 when the reset shaft 21 has completed its resetting operation in a clockwise direction (Fig. 1). Moreover, it will be noted that the drum surface on each of the driving elements 13 of the clutches 12 is engageable by brake members 47 having oppositely disposed fork portions engageable to grip opposite sides of the drum. These brake members also have operating portions 48 disposed around the axis of the resetting shaft 21 and adapted to be controlled by controlling mechanism operative as that shaft is rotated to effect resetting. Moreover, it will be noted that both the stop arm 42 and the brake members 47 are controlled and timed in their operation, by controlling mechanism operative during the rotation of the reset shaft 21, while spring means are also provided which cooperate with the control mechanism to return the parts following resetting to the reset or initial position thereof shown in Figure 1 wherein they are ready for the resumption of counting after each resetting operation.

The several mechanisms as above described down through the stop arm 42 and brake members 47 are generally similar to those in my prior application, save for the loose journaling of the arm 42 on the shaft 21, and for the ball clutch 12, and for the intermediate gears 17, 17a, 17b, 17c in the driving trains for the wheels of lowest order in the several counters, and for like intermediate gears 25 in the resetting trains. However, it will be noted that herein, improved operating mechanism and improved controlling mechanism is provided, adapted to operate and control the brake members 47, and the stop arm 42, and to insure the return to zero of all of the number wheels in the several counters when the latter are reset.

Referring more particularly to the improved operating mechanism, it will be noted that herein the front end of the reset shaft 21 carries, just inside the operating socket 22, a round cam 55 fixed to the shaft 21 and having a peripheral notch 56, this cam being generally similar to that in my prior application but having this notch normally disposed angularly to the left of its position therein. Between this cam 55 and the frame and in spaced relation to the cam and preferably keyed therewith to a common sleeve 57 fixed to the shaft 21, is a ratchet 58 of improved construction. Herein, this ratchet 58 has an enlarged peripheral tooth 59 presenting a radial abutment 60 terminating at its inner edge in a short length of cam track 61 disposed concentric with the axis of the shaft 21. The opposite end of this cam track terminates in one of the toothed faces of the first of two ratchet teeth 62, 63, while beyond the second ratchet tooth, an abutment 64 is provided, and a cam track 65 concentric with, but shorter than, the cam track 61. This cam track 65, in turn, has a notch 66 therein providing an abutment 67 likewise having a cam track 68 concentric through the outer portion of the same with the cam tracks 61 and 65, and also extending outward to form the outer periphery of the tooth 59. Cooperating with the ratchet thus described, is a pawl 69, pivoted at 70, and normally pressed into engagement with the ratchet surface by a suitable spring 71. Cooperating with the cam 55 as the latter rotates in a clockwise direction during resetting, is a roller carrying pin 72, which is disposed, as shown in Figure 1, in the notch 56 in the cam 55 in the initial or normal position of the parts when ready for resetting. This pin is carried on a plate cam 73 pivoted on the shaft 10 above the reset shaft 21. As shown, this cam 73 is provided with a straight side 74 which is disposed substantially vertically in the normal position of the parts shown in Figure 1, the cam 73 being normally retained in this upright position by a coiled spring 75 connected between a lug 76 on the upper end of the cam and a point on the frame, herein a shaft 77 carrying the transfer pinions 29. On the top of the cam 73, and on the opposite edge from the edge 74, the cam is provided with an extension 78 and a generally U-shaped notch or cam 79 under this extension and having a shorter lower cam face 80 which terminates in a downwardly extending, slightly rounded cam dwell face 81. Below this face 81, the cam is extended laterally from said face to provide another curved cam track 82 extending downward and slightly inwardly and terminating in a projection 83. A further projection 84 is also provided on the under side of the cam to the left and below the projection 83. Note here also that the cam provides an abutment face 85 between the projection 84 and the pin 72 and extending below the latter in the initial position of the cam. Thus, it will be evident that as the resetting shaft 21 is turned to the right from the position shown in Figure 1, the ratchet 58 and cam 55 will move to the position shown in Figure 3, and, through the engagement of the pin 72 with the notch 56, cause the cam 73 to occupy the angularly disposed position shown in Figure 3.

Figure 10:
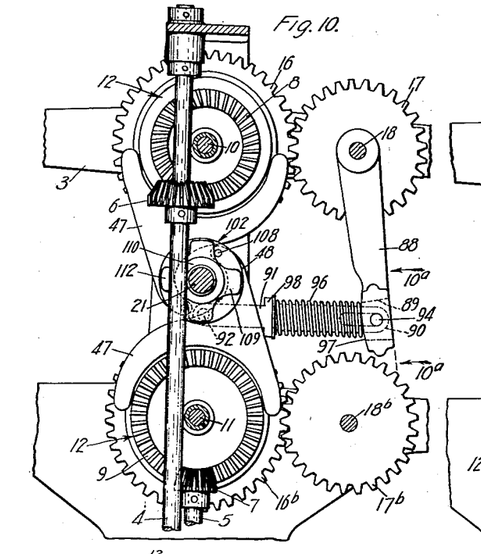
Fig. 10 is a sectional view on line 10—10 of Figure 2, showing elements of the drive and the brake mechanism, with the brake in "off" position.
Figure 11:
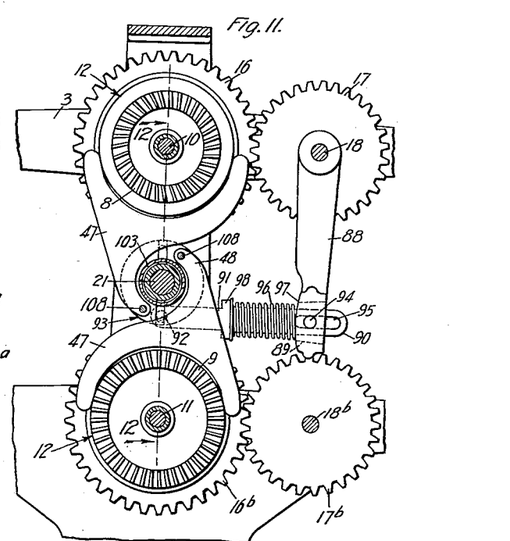
Fig. 11 is a view similar to Figure 10 but omitting the driving connections and showing the brake in "on" position.

Operated and controlled by the operating mechanism just described is improved brake actuating and controlling mechanism. More particularly, cooperating with the notch or cam track 79, and normally resting on the lower cam face 80 thereof, is a pin 86 carried on an arm 87, fixed for rotation with the shaft 18. Thus, this shaft 18 will be rotated upon the just described initial counterclockwise movement of the cam 73. This rotation of the shaft 18, in turn, rotates an arm 88 fixed to the shaft 18 and which, during counting, depends therefrom in the position shown in Figure 10. The lower end of this arm 88 is provided with a longitudinally disposed slot 89 which, in turn, receives a correspondingly shaped slotted extension 90 on a member 91 which is pivoted to a pin 92 on a brake actuating disc 93 coaxial with the shaft 21 and located substantially midway between the ends thereof. Note also that the member 88 carries a pin 94 extending transversely across the slot 89 and through a slot 95 in the member 91 and that a coiled spring 96 is disposed on the latter member between an adjacent curved face 97 on the member 88 and an abutment 98 on the member 91, in such manner that, as the member 88 is moved about this pivot in a clockwise direction from the position shown in Figure 10, the spring 96 will be compressed and the disc 93 rotated, the parts then assuming the position shown in Figure 11. Considering the disc 93, it will be noted that the pivot pin 92 thereon, as shown in Figure 10, is disposed five degrees to the right of a vertical line extending through the axis of the shaft 21 and disc 93, whereas, when the member 91 has been moved to the left, as shown in Fig. 11, the pin and disc have been rotated to the left to bring the center of the pin and of the disc into the vertical line mentioned. Thus, it will be evident that only a very slight movement of the cam 73 and the associated mechanism connected thereto, is necessary to move the disc 93 from its position shown in Figure 10, wherein the brake members 47 are released, into the position shown in Figure 11, wherein the brake members 47 are in braking engagement with the drums on the clutch elements 13.

Figures 10A, 12, 13, 14:
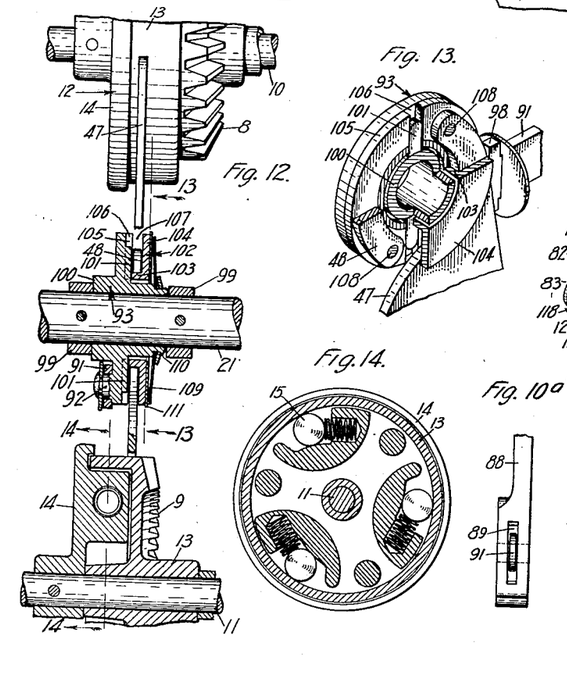
Fig. 10a is a sectional view on line 10a—10a of Figure 10.
Fig. 12 is an enlarged view of the brake and clutch mechanisms, a portion of the same being in section on line 12—12 of Figure 11.
Fig. 13 is a detail perspective view partially in section on line 13—13 of Figure 12.
Fig. 14 is a sectional view of the clutch mechanism on line 14—14 of Figure 12.

Referring more in detail to the brake operating and controlling mechanism between the disk 93 and the brake members 47, it will be noted that the disk 93 is journaled between collars 99 on the shaft 21, and that this disk is provided with a hub portion 100 and with oppositely disposed keys 101, preferably integral with the remainder of the disk 93. Further, it will be noted that associated with the disk 93 is a cooperating collar 102 (Fig. 12) having a sleeve portion 103 which is received on the hub portion 100 of the disk 93 and which carries spaced flanges 104 and 105. As shown, this sleeve portion 103 is spaced from the hub portion 100 around the periphery of the hub 100, as illustrated in Figure 12. Also, it will be noted that the flange 105 is provided with oppositely disposed aligned keyways 106 receiving the keys 101 on the disk 93, while the spacing of the flanges 104, 105 produces an annular recess 107 adapted to receive the extremities of the portions 48 on the braking members 47. Here note also that these portions 48 are pivoted on pins 108 at diammetrically oppositely located points in the annular recess 107. Further, the collar 102 is pressed into engagement with the disk 93 by a spring washer 109, suitably attached, as by a peaned connection 110, to a reduced extension on the hub 100 of the disk 93, while a suitable fiber disk 111 is preferably disposed between the faces of the arms 112 of this spring washer and the adjacent face of the flange 104. Thus, it will be evident that, as the disk 93 is moved in a clockwise direction from the position shown in Figure 10 to the position shown in Figure 11, a very small angular movement, herein 5°, will result in so moving the pivot pins 108 of the brake members 47, as to move the latter from the released position shown in Figure 10 to the braking position shown in Figure 11. Further, it will be evident that, due to the floating connection provided between the collar 102 and the disk 93, it is possible to avoid binding in any position of the parts, irrespective of which brake member 47 first engages its drum, and also to permit an equal application of the brake members 47 to their drums, irrespective of variations in the construction of either of these members, or in their time of engagement with their respective drums. Here, of course, it will be understood that the space between the sleeve 103 and hub 100 is sufficient to permit free movement under all conditions, and that the keys 101 and the keyways 106 thus insure freedom for a vertical movement under all conditions. Here, it will also be evident that, while the vertical movement required by the aligned keys 101 and the keyways 106 will ordinarily only occur when the parts are initially operated, this mechanism will be operative to compel such an alignment at all times, and that the spring washer 109 will act to hold the parts in the desired relation during repeated operations of the brake without imposing a load upon the shaft 21.

Figure 3:
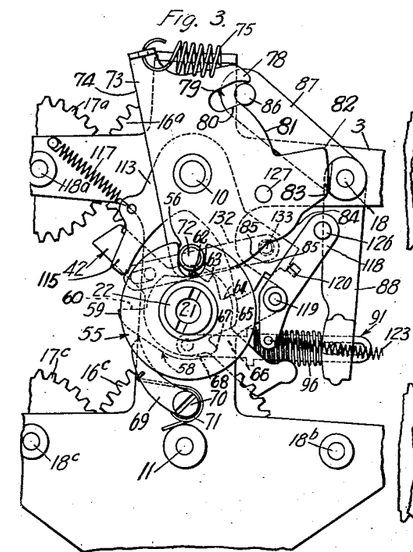
Fig. 3 is a side elevation of the controlling mechanism shown in Figure 1, but after the same has moved into the brake applying position thereof, occupied before the reset operating member reaches the first of the ten so-called click positions of the mechanism which are successively assumed during a complete resetting operation.

With the driving shafts 10 and 11 thus braked by the members 47, when the controlling mechanism is moved from the position shown in Figure 1 to that shown in Figure 3, it will be evident that the brake members 47 will be positively applied at the very beginning of the resetting operation. Further, as will hereinafter appear, the cam 73 is maintained in such brake applying positions during the remainder of the resetting operation, that, due to the engagement of the pin 86 with the dwell face 81, these brake members 47 are kept positively applied throughout the entire resetting operation and until the several counters are returned to zero position. Moreover, while the brake members 47 are thus applied, it will be noted that the spring 96 is under compression, with the pin 94 then disposed near the left hand end of the slot 95 in the member 91. When, however, the pin 86 is permitted to move back into the notch 79 and down the lower cam face 80 thereon, the brake will be released during the final stages of the movement of this pin 86, and the spring 96 will then return the pin 94 to the position shown in Figure 10, whereupon the spring 75 will move the cam 73 and the pin 86 and link 88 in such manner as positively to rotate the disk 93 and thereby positively release the brake. Attention is also directed to the fact that when the pin 86 engages the end wall of notch 79, this effectually prevents reverse movement of the shaft 21 from the normal position thereof shown in Figure 1.

Figure 16:
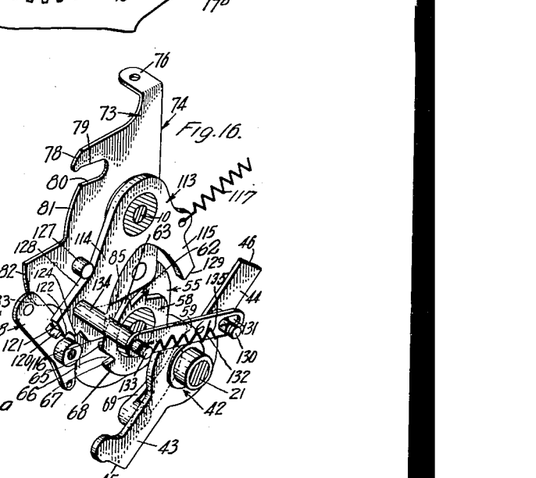
Fig. 16 is a perspective view of the controlling cam and associated control members, viewed from the inside of Figure 1, obstructing portions of the frame being omitted to facilitate illustration.
Figure 17:
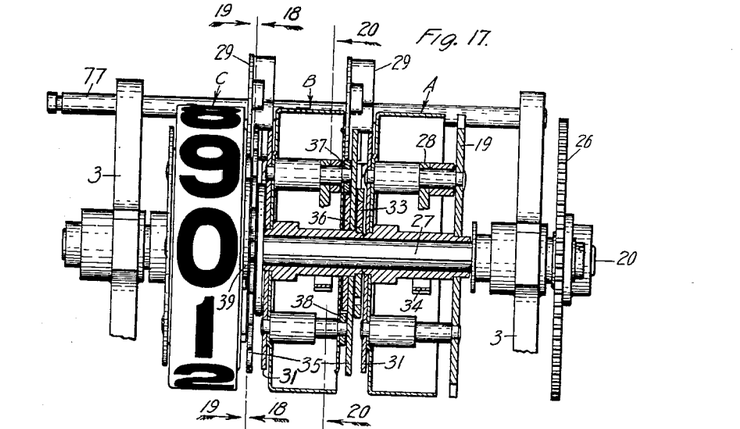
Fig. 17 is a side elevation partially in section, of one of the cost mounters.
Figure 18:
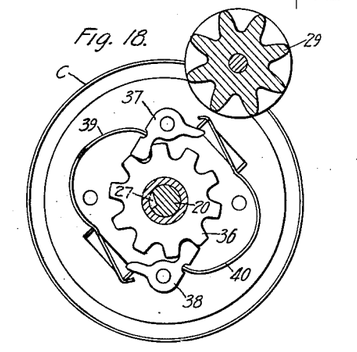
Fig. 18 is a sectional view on line 18—18 of Figure 17.
Figure 19:
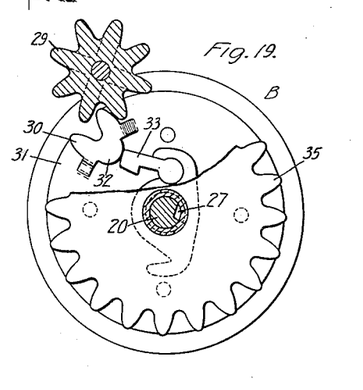
Fig. 19 is a sectional view on line 19—19 of Figure 17.
Figure 20:
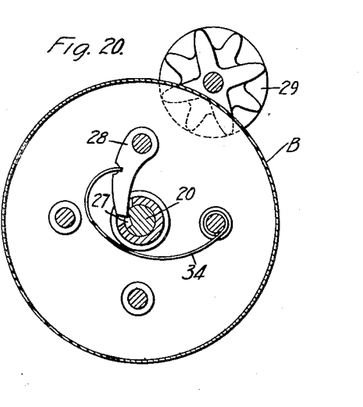
Fig. 20 is a sectional view on line 20—20 of Figure 17.
Figure 21:
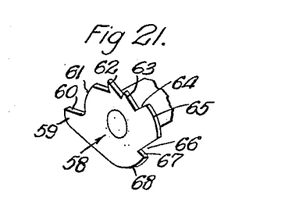
Fig. 21 is a detail view of the ratchet.

Operatively associated with the cam 55 and ratchet 58 is improved controlling mechanism controlling the reverse rotation of the resetting shaft 21. This mechanism includes an improved non-return pawl 113 pivoted on the shaft 10 and disposed between the cam 73 and the frame. As shown, this member has two arms 114 and 115 depending below the pivot to produce a member of generally U form. In the position of the member 113 shown in Figure 1, it will be noted that the arm 114 has an inner edge portion 116 (Fig. 16) engaging with the cam track 65 on the ratchet 58. However, as the ratchet 58 is rotated slightly beyond the position shown in Figure 3, it will be noted that the portion 116 passes off of the cam track 65, and that the portion 116 then moves in back of the abutment 64, due to the action of a coiled spring 117 which is connected between the arm 115 and the frame. Thus, should the operator endeavor to reverse the shaft 21 and ratchet 58, the engagement of this portion 116 of the non-return pawl 113 with the abutment 64, prevents such reverse movement. However, if the operator continues to move the reset shaft in the intended clockwise direction to effect resetting, the continued movement of the ratchet 58 will cause the tooth 63 on the ratchet to pass under the portion 116 of the pawl 113, and, thereby, similarly prevent backward movement, this position being the so-called first click position, corresponding to a movement of $\frac{1}{10}$ of a revolution of the several number wheels. Further movement of ratchet 58 in a clockwise direction will bring the portion 116 behind ratchet tooth 62, which is the position known as the second click, corresponding to $\frac{2}{10}$ of a complete revolution of the number wheels. As the ratchet is moved toward the third click position, the peripheral tooth 59 on the ratchet moves in under the portion 116 as the pawl 69 moves into engagement with the tooth 66, the pawl 69 then preventing any substantial reverse movement of the shaft 21 in this third click position of the parts.

Figure 6:
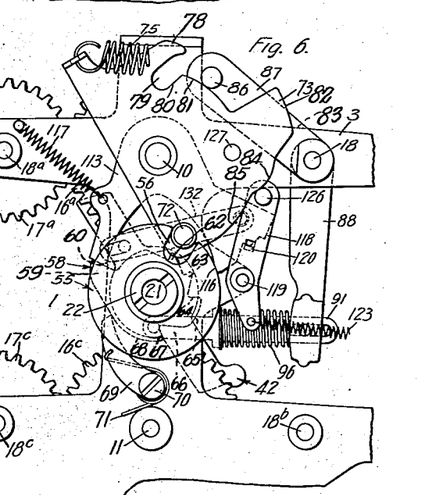
Fig. 6 shows the same in the position occupied after the tenth click, but before the operator has released the reset operating member to permit it to return to the position shown in Figure 1.

Cooperating with the non-return pawl 113 is also a non-return pawl latch 118 which becomes operative as the parts approach the third click position. This member 118 is substantially upstanding in all its positions and is pivoted nearer its lower end at 119 on the frame at a point below the end of the arm 114. Further, as shown, this latch has a struck-in lug 120 which in the position of the parts shown in Figure 3, engages an end portion 121 on the arm 114. When the tooth 59 on the ratchet engages the inside of the arm 114 to raise the latter and rock the same about the pivot 10, this projection 120 is caused to be snapped in under an upper latch face 122 on the arm 114, by a coiled spring 123 connected to the lower end of the latch 118 below the pivot 119 thereof. As the shaft 21 is moved from the third click position toward the fourth click position, the latch projection 120 will drop in under a lower latch face 124 on the arm 114, and almost immediately thereafter the pawl 69 will drop in back of a tooth 64 on the ratchet 58, all in such manner as thereby to prevent reverse movement of the shaft 21 in this position of the parts. In this position, note also that, as a result of the movement of the arm 114 by the projection 59 on the ratchet 58, the end of the arm 115 is moved down into position to be engaged by the projection 59 at the end of the clockwise resetting rotation of the ratchet 58. Further, it will be noted that the non-return pawl 113 remains in this position, latched by the lug 120 on the latch 118, until the resetting movement of the number wheels of the counters 1, 2 is completed. As the rotation of the ratchet 58 is continued from the fourth click position, it will be evident that the shaft 21 will be held against reverse rotation by the pawl 69 which successively engages behind the teeth 64, 63 and 62 in the fifth, sixth and seventh click positions. While reverse movement of the ratchet 58 and shaft 21 is permitted in the ninth and tenth click positions, it will be noted that after the tenth click position, i. e. as the cam 73 is turned angularly by its spring 75 when its pin 72 enters the notch 56 in the cam 55 (see Figure 6), the latch 118 is disengaged from the non-return pawl 113. More particularly referring to Figure 6, note that as the pin 72 enters the notch 56, a pin 126 on the upper extremity of the latch 118 is engaged by the projection 84 on the cam 73 in such manner as to swing the latch 118 back about its pivot 119, and thereby cause its projection 120 to disengage from the lower latch face 124, whereupon the arm 114 of the non-return pawl 113 is swung downward in such manner as to bring the upper latch face 122 into engagement with the projection 120. Thereafter, as the cam 73 moves further toward its starting position shown in Figure 1, the projection 83 on the cam engages the pin 126, and thereby releases the upper latch face, in such manner as to free the pawl 113 for further movement by its spring. Further, note that a pin 127 on the cam 73 also engages the upper edge 128 of the pawl arm 114 as the cam continues to move, in such manner as to enable this pin 127 to cooperate with the spring 117 and positively insure the return of the pawl 113 to the starting position shown in Figure 1, wherein the extremity 129 of its arm 115, is disposed out of the path of the projection 59 on the ratchet 58, while the ratchet 58 is prevented from further reverse rotation by the pin 86 in the notch 79 in the cam 73.

Cooperating with the mechanism above described is improved mechanism for controlling the stop arm 42 and throwing it into and out of the path of the blocks 41 on the gears 16a, 16c which, as described in my above mentioned application, are rotated during resetting as the number wheels of counters 1, 2 approach the zero position. This improved mechanism makes it impossible for the stop arm 42 to be thrown out of the path of the blocks 41 by a reverse movement of the shaft 21, after it has once been moved into this path of these blocks, until resetting of the number wheels of the counters 1 and 2 has been completed. Note here that, in addition to the elimination of the friction clutch previously provided between the stop arm 42 and the shaft 21, and as a result of which this arm might be moved either forward with the resetting shaft or reversely with that shaft in the several click positions, the improved mechanism hereinafter described controls and operates the member 42 in an improved manner, while preventing reverse movements of the latter, as hereafter described.

Figure 7:
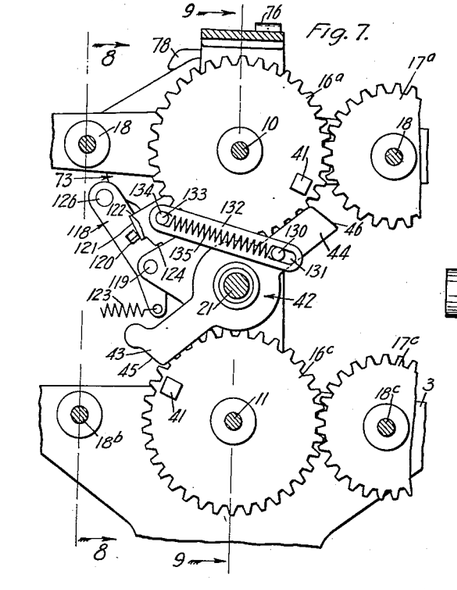
Fig. 7 is a sectional view on line 7—7 of Figure 2.
Figure 8:
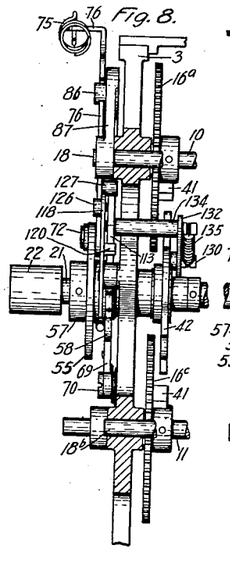
Fig. 8 is a sectional view on line 8—8 of Figure 7.
Figure 9:
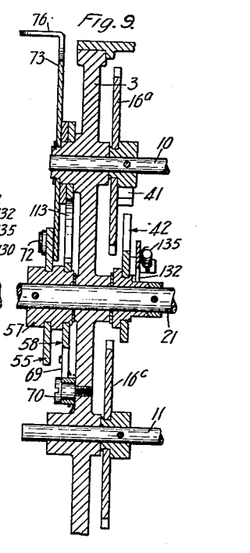
Fig. 9 is a sectional view on line 9—9 of Figure 7.

As shown, in this mechanism a pin 130 projects laterally from the portion 44 of the arm 42 substantially midway between the extremity of this portion 44 and the axis of the arm 42. This pin 130 extends into a slot 131 disposed longitudinally of a cooperating arm or link 132 which is pivoted at 133 on a pin 134 which extends laterally over the plane of movement of the arm 42 and is carried on the arm 114 of the non-return pawl 113 at a point adjacent and just inside of the latch faces 122, 124 (see Figure 16). Moreover, note that a coiled spring 135 is suitably connected between the extremities of the pins 130 and 134, and that this spring acts to hold the pin 130 in the inner end of the slot 131. Thus, when the pawl 113 is in the position shown in Figures 1 and 3, the portions 43 and 44 on the stop arm 42 are so disposed that their abutment ends 45 and 46 are out of the path of the blocks 41. When, however, as a result of the movement of the pawl 113 heretofore described, the arm 114 thereof is swung up from the position shown in Figure 4 to the position shown in Figure 5, the stop arm 42 is so swung as to bring its abutment faces 45, 46 into the path of the blocks 41; the arm 42 being swung into this position in two steps as the projection 120 successively engages the latch faces 122, 124. Further, it will be noted that the pawl 113 remaining in this position, as a result of the engagement of its lower latch face 124 by the projection 120 on the latch 118, from the position shown in Figure 5 throughout the remainder of the clockwise resetting rotation of the shaft 21, the stop arm 42 throughout this remaining rotation of the shaft 21, will be held in its desired block engaging position, by the spring 135. Thus, with the parts in this position, inadvertent operation of the pump cannot damage the mechanism. Further, it will be evident that when the non-return pawl 113 is released by its latch 118, the downward movement of the pin 134 will be transmitted through the link or arm 132 to the pin 130 on the stop arm 42, and, thereby, positively swing the latter out of the path of the blocks 41, while the spring 135 will continue to maintain the pin 130 in the position illustrated in Figures 7 and 16. Thus, not only is the stop arm 42 taken out of the control of the operator in such manner as to avoid attempts at fraudulent manipulation thereof by reverse movements of the shaft 21, but the arm 42 is also caused to be thrown into its stop engaging position at the desired time, and, further, positively moved out of that position when the non-return latch 113 has its abutment portion 129 positively moved out of the path of the projection 59 by the action of the pin 127 carried on the cam 73.

Here attention is also directed to the fact that improved mechanism is provided which is automatically operative when the cam 55 is reversely operated by the spring 75 following release by the operator in the tenth click position, this mechanism being thus operative to insure the picking up by the notches 27 in the several counter resetting shafts 20, of any of the number wheels of the counters 1, 2 which may be in the "nine" position when resetting begins. This is desirable, for example, to prevent dragging forward by a higher order wheel during resetting, of an unlocked number wheel, i. e. one in the "nine" position. To prevent this difficulty, in my previous application, in which there was a smaller reverse movement, springs corresponding to the clutch springs 39, 40 herein, were provided in the several counter wheels, which were of different strength, with the springs in the middle number wheel B stronger than those in the next higher order wheels C. My improved construction makes it possible to eliminate this difference in spring strength with resultant difficulties, and to use a standard spring in all number wheels B, C.

Figure 4:
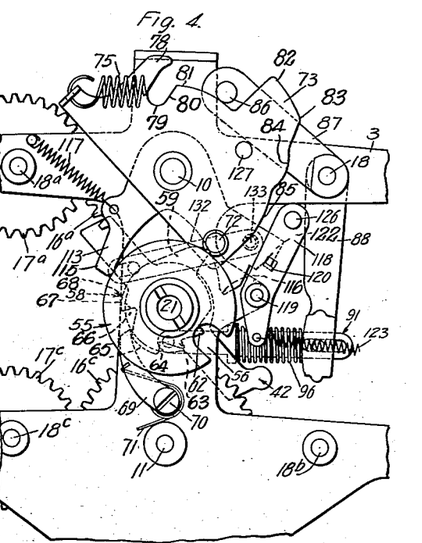
Fig. 4 is view similar to Figure 3 showing the position of the parts approaching the third click position.
Figure 5:
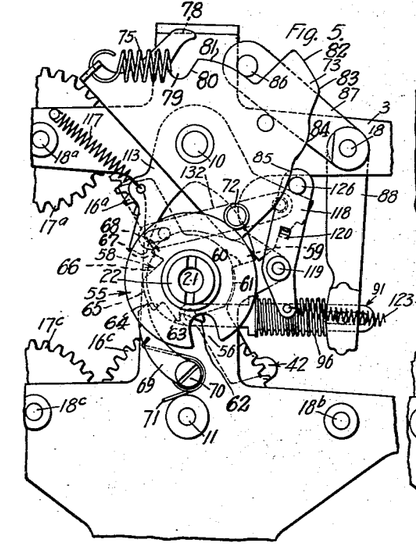
Fig. 5 shows the same approaching the fourth click position.

Referring more particularly to this improved structure, it will be noted that with cam 73 in the position shown in Figures 4 and 5, i. e. the position in which this cam remains while the pin 72 is on the unnotched periphery of the cam 55, the edge 74 of the cam 73 is disposed at an angle of 45° to the vertical position of this edge shown in Figure 1 and to which the edge 74 is returned after the completion of resetting. Thus, the cam 73 is caused to move through an angle of 45° under the action of its spring 75 as its pin 72 enters the notch 56, and while the cams 73 and 55, with the associated ratchet 58, are being returned to their initial or starting position shown in Figure 1. As a result of the reverse movement of the cam 55 with the cam 73, the cam 55 is also moved through an angle of 45° in a direction opposite to the resetting direction. Consequently, the resetting shaft 21 is moved backward beyond its zero position through an angle of 45°, and, through its connection to the reset operating gear 23, the resetting trains 24, 25 and 26 are similarly operated reversely through an angle of 45°, in such manner as to rotate the resetting shafts 20 of the several counters 1, 2 through a like angle. As a result, the resetting grooves or notches 27 in these shafts 20 are moved back substantially more than one-tenth of a complete resetting movement of the shafts 20, i. e. more than the 36° necessary to insure picking up of the pawls 28 of the counter wheels even if the latter should be in the so-called "9" position thereof when resetting begins. Accordingly, all of the counter wheels, irrespective of their position and even if some are disposed in the "9" position, are returned with certainty to zero position irrespective of the springs.

Attention is further directed to the fact that my improved mechanism, while having the advantages above set forth, is also more readily operated to effect resetting. This is due, in part, to the elimination of the two friction clutches shown in my previously mentioned application, one of which was associated with the brake and the other of which was associated with the stop arm. Both of these, and the consequent drag thereof imposed during the resetting operation, are eliminated in my improved construction. Instead, the spring washer 109, associated with the brake mechanism shown herein, is only a locating spring and does not impose any drag on the operation of the shaft, this washer acting only to locate or retain the keys 101 and keyways 105 in the desired relation. Further, with the stop arm 42 freely rotatable on the shaft 21, obviously no drag is imposed on the latter.

As a result of my improved construction, it will be noted that it is made possible to obtain, following resetting, both an accurate count and a coordinated reading on the cost and quantity counter, and to do this irrespective of the method of operation of the reset operating member or reset shaft 21 by the operator. Thus, the mechanism is such as to produce these results whether the operator operates the resetting mechanism gently or roughly, while, once the resetting operation is started, the operator has to complete the same before counting can be resumed. As regards attempted manipulation, also note that the braking mechanisms for the separate drive trains for the cost and quantity counters are maintained in braking position throughout the resetting operation, in such manner that it is made impossible for an operator, through reversals of the reset operating member and shaft 21, to release the braking mechanism during resetting; the latter, instead, only being releasable upon the completion of resetting and then automatically released as the controlling cam 73 moves from the stationary position, which it assumes as resetting begins, back to its initial position shown in Figure 1. Further, note that, similarly, the operator is unable to swing the stop arm 42 out of its stopping position until the completion of resetting, when this stop arm is likewise automatically thrown out of that position as the other parts return to the position shown in Figure 1. Moreover, note that throughout the major portion of the resetting operation, it is made impossible for the operator to rotate the resetting shaft reversely, while such reversals of the same as are possible during certain stages of the resetting operation, are also rendered harmless through my improved cooperating controlling mechanism. Also note that upon the completion of resetting, the resetting shafts in the several counters are moved reversely through an angle of 45°, automatically and in such manner as to insure the return to zero of all of the number wheels on the several counters irrespective of the different positions which the wheels may occupy at the beginning of the resetting operation. Thus, irrespective of various operations or attempted operations of the resetting mechanism, or of the positions which any number wheel of any of the several counters may occupy at the beginning of resetting, and as a result, of the cooperating controlling mechanisms acting or controlling the number wheels and their counting and resetting drives, it is made possible to insure coordination of the readings of the several cost and quantity counters in any counting operation following resetting.

While I have in this application specifically described one embodiment which my invention may assume in practice, it will be understood that the same has been shown for purposes of illustration, and that the invention may be modified and embodied in various other forms without departing from its spirit or the scope of the appended claims.

What I claim as new and desire to secure by Letters Patent is:

1. In combination, a counter having driving mechanism and resetting mechanism, braking mechanism for said driving mechanism, and mechanism controlled by said resetting mechanism for applying and releasing said braking mechanism and having means for maintaining said braking mechanism in braking position until said counter has been reset.

2. In combination, a counter having driving mechanism, resetting mechanism having a reversible operating member and means for reversing the latter when said counter has been reset, braking mechanism for said driving mechanism applied by said resetting mechanism, and controlling means for said braking mechanism maintaining the latter in braking position until said operating member is reversed by said reversing means.

3. In combination, a counter having a driving mechanism, resetting mechanism for said counter including resetting controlling means, and braking mechanism for said driving mechanism locked in braking position by said controlling means during resetting.

4. In combination, a counter having a driving mechanism, resetting mechanism for said counter including a controlling cam, and braking mechanism for said driving mechanism held in braking position by said cam during resetting.

5. In combination, a counter having a driving mechanism, resetting mechanism for said counter including a controlling cam, braking mechanism for said driving mechanism, and means actuated by said cam for applying and holding said braking mechanism in braking position during resetting.

6. In combination, a counter having a driving mechanism, resetting mechanism for said counter including a controlling cam, braking mechanism for said driving mechanism applied by said cam, and means controlled by said cam for automatically releasing said braking mechanism upon completion of resetting.

7. In combination, a counter having driving mechanism and resetting mechanism including a controlling cam, braking mechanism for said driving mechanism actuated and released by said cam, and stop mechanism for said counter operative by said resetting mechanism and released by said cam.

8. In combination, a counter having a plurality of operatively connected number wheels and resetting mechanism including a resetting shaft and cooperating means operative to effect resetting of said wheels upon a complete revolution of said shaft, and operating mechanism for actuating said resetting mechanism rotating said shaft in one direction during resetting and having means for reversely rotating said shaft following resetting through an angle greater than thirty-six degrees.

9. In combination, a counter, driving mechanism therefor including a clutch having driving and driven elements, a brake member operating on said driving element, resetting mechanism for said counter, and means actuated upon initiation of resetting for applying said brake member, preventing the release thereof until the completion of resetting, and thereupon releasing said brake member.

10. In combination, a counter, driving mechanism therefor including a clutch having driving and driven elements, a brake member operating on said driving element, resetting mechanism for said counter, and means actuated upon initiation of resetting for applying said brake member, preventing the release thereof until the completion of resetting, and thereupon releasing said brake member, said brake member being pivotally mounted and said last mentioned means including a rotatable disc on which said member is pivotally mounted and also including means pivotally connected to said disc for rotating the same to apply and release said brake member.

11. In combination, a counter, driving mechanism therefor including a clutch having driving and driven elements, a brake member operating on said driving element, resetting mechanism for said counter, and means actuated upon initiation of resetting for applying said brake member, preventing the release thereof until the completion of resetting, and thereupon releasing said brake member, said braking member being pivotally mounted and said last mentioned means including a rotatable disc on which said member is pivotally mounted and also including means pivotally connected to said disc for rotating the same to apply and release the brake including a lost motion connection between said disc and said resetting mechanism.

12. In combination, a counter having driving mechanism, counter resetting mechanism including a resetting shaft, braking mechanism for said driving mechanism, and brake operating mechanism including an angularly movable brake operating member having a floating mounting on said resetting shaft and having a portion normally disposed at an angle to a vertical plane through said shaft and also including means controlled by said resetting mechanism for moving said member positively into said plane to apply the brake.

13. In combination, a counter, resetting mechanism therefor having a reset shaft, stop mechanism for said counter for stopping the same in zero position upon completion of a resetting operation and including a movable stop, a cam associated with said reset shaft for positively moving said stop to operative position when said shaft is turned in a direction to turn said counters to zero, a latch for holding said stop in operative position until completion of the resetting of said counter, and means associated with said reset shaft for moving said latch member to non-latching position and thereby releasing said stop after the completion of the resetting of said counter.

14. In combination, a counter, a driving train therefor, resetting mechanism including a reset shaft, means for reversing the reset shaft when the counter has been reset, stop mechanism for said counter including a stop on an element of said driving train and a cooperating stop movable into and out of operative position with respect to said first stop, a latch member connected to said movable stop, a second latch member for holding said first latch member in a position to maintain said movable stop in operative position, a cam associated with said reset shaft for moving said first latch member in a direction to move said stop to operative position, and means operated by said reset shaft for releasing the second-mentioned latch member from the first-mentioned one after the resetting operation has been completed and upon reverse movement of said reset shaft.

EDWARD A. SLYE.